Nov. 18, 1969 F. W. WEBER 3,479,606

PHASE SYNCHRONIZATION CIRCUIT

Filed May 31, 1966

United States Patent Office 3,479,606

Patented Nov. 18, 1969

3,479,606

PHASE SYNCHRONIZATION CIRCUIT

Frank W. Weber, Duarte, Calif., assignor to Burroughs Corporation, Detroit, Mich., a corporation of Michigan Filed May 31, 1966, Ser. No. 554,128
Int. Cl. H03k 3/06
U.S. Cl. 328—201 5 Claims

ABSTRACT OF THE DISCLOSURE

A flip-flop to be synchronized has first and second output terminals in complementary states and first and second input terminals each effective to introduce a different change in the state of the flip-flop. A first holdover circuit is connected from the first output terminal of the flip-flop to the first input terminal and a second holdover circuit is connected from the second output terminal of the flip-flop to the second input. As a result of these connections, the flip-flop operates astably. Synchronizing pulses are applied to the second holdover circuit and directly to the first input terminal of the flip-flop. Consequently, the flip-flop is synchronized to the synchronizing pulses.

This invention relates to phase synchronization circuits and more particularly, to circuitry especially well-suited for synchronizing a source of periodic signals to irregularly occurring synchronizing pulses.

It is common practice to synchronize an astable, i.e. free-running multivibrator or other relaxation type source of periodic signals to synchronizing pulses. The free-running multivibrator has a natural frequency of operation that is slightly lower than the frequency of occurrence of the synchronizing pulses. As a result, each synchronizing pulse triggers the free-running multivibrator into a change of state prematurely. Upon initial energization, both halves of the free-running multivibrator occasionally come up in the same state. Thus the multivibrator does not operate until one half is forced into a different state.

If measures are taken to prevent both halves of the free-running multivibrator from initially coming up in the same state, the above-described mode of operation is satisfactory in the case of regularly occurring synchronizing pulsees. In some environments, however, synchronizing pulses occur irregularly. In the latter case, the synchronizing signal can be viewed as having time slots occurring at the nominal, desired frequency of the system. But not all of these time slots are occupied by synchronizing pulses. During time intervals between successive synchronizing pulses or groups of pulses, the free-running multivibrator therefore operates at a frequency that is lower than the nominal frequency of the system. This may be highly detrimental, when the time interval between synchronizing pulses is long, since the phase error of the free-running multivibrator mounts steadily with each cycle between synchronizing pulses.

According to the invention, a bistable device that is controlled by holdover indications generated a predetermined time after each of its changes of state is synchronized to irregularly occurring synchronizing pulses. Specifically, one holdover indication, which is generated responsive to changes from a first state to a second state, returns the bistable device to the first state after the predetermined time, and another holdover indication which is generated responsive to changes from the second state to the first state, returns the bistable device to the second state after the predetermined time. Consequently, the bistable device operates, i.e. runs freely, at a natural frequency with a period equal to twice the predetermined time interval. Synchronization of the bistable device takes place regardless of the relationship between its natural frequency and the frequency of the time slots of the synchronizing pulses. Thus the natural frequency of the bistable device can be made exactly equal to the nominal frequency of the system.

If a synchronizing pulse appears while the bistable device is in the second state, the synchronizing pulse is effective to generate a holdover indication that delays the return of the bistable device to the first state by the predetermined time. In this case, the operation of the bistable device is slowed down to bring its output into phase with the synchronizing pulse. If a synchronizing pulse appears while the bistable device is in the first state, the synchronizing pulse becomes effective to change the state of the bistable device directly. In this case, the operation of the bistable device is sped up to bring its output into phase with the synchronizing pulse. In both cases, the return of the bistable device to the first state is, with a delay of the predetermined time, synchronized to the synchronizing pulses.

The arrangement of the invention is self-starting, i.e. it can not fall into the predicament of the free-running multivibrator that operation possibly does not commence upon energization. Accordingly, although the principal advantage lies in use of the invention for phase synchronization, advantage is also derived by use of the invention as a free-running unsynchronized source of pulses.

These and other features of the invention are described further in the following detailed description taken in conjunction with the drawings in which.

Figure 1:
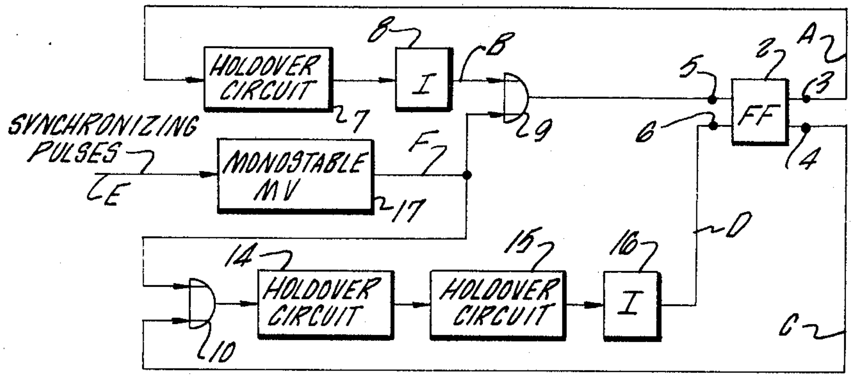
FIG. 1 is a schematic circuit diagram in block form of an arrangement embodying the principles of the invention.

Reference is now made to FIG. 1, in which a flip flop 2 serves as the bistable device. Flip flop 2 and the other elements in FIG. 1 are binary circuit elements that assume either of two states, hereafter designated states "0" and "1." Flip flop 2 has an output terminal 3 and an output terminal 4 that assume complementary states, i.e., when one output terminal is in state "0," the other output terminal is in state "1." If the signal applied to an input terminal 5 of flip flop 2 changes from state "0" to state "1" while output terminal 3 is in state "0," flip flop 2 is triggered into a change of state. If the signal applied to an input terminal 6 changes from state "0" to state "1" while output terminal 4 is in state "0," flip flop 2 is also triggered into a change of state. Output terminal 3 of flip flop 2 is connected to the input of a holdover circuit 7. The state at the output of holdover circuit 7 is inverted by a phase inverter 8, the output of which is applied to one input of an OR circuit 9. The output of OR circuit 9 is connected to input terminal 5 of flip flop 2. Output terminal 4 of flip flop 2 is connected to one input of an OR circuit 10. Holdover circuits 14 and 15 are connected in tandem to function as a single holdover circuit. Two holdover circuits are employed for reasons explained later in the detailed description. The output of OR circuit 10 is connected to the input of holdover circuit 14. The state at the output of holdover circuit 15 is inverted by a phase inverter 16, the output of which is connected to input terminal 6 of flip flop 2. Irregularly occurring synchronizing pulses are applied to a monostable multivibrator 17 that produces pulses with uniform, preferably short width. The pulses produced by monostable multivibrator 17 are applied to the other input of OR circuit 9 and the other input of OR circuit 10.

Figure 2:
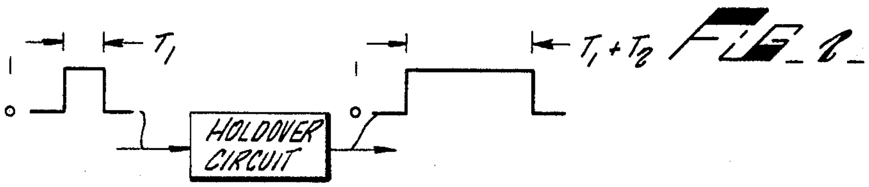
FIG. 2 is a diagram illustrating the function of a holdover circuit.

Holdover circuits such as circuits 7, 14, and 15 are well known in the art as typified by my Patent 3,217,172, issued Nov. 9, 1965 and assigned to the assignee of the present application. As shown in FIG. 2, in response to an input pulse with a width $T_1$, the holdover circuit generates an output pulse whose duration is held over an additional time $T_2$. Thus, the width of the output pulse is $T_1+T_2$.

Figure 3:
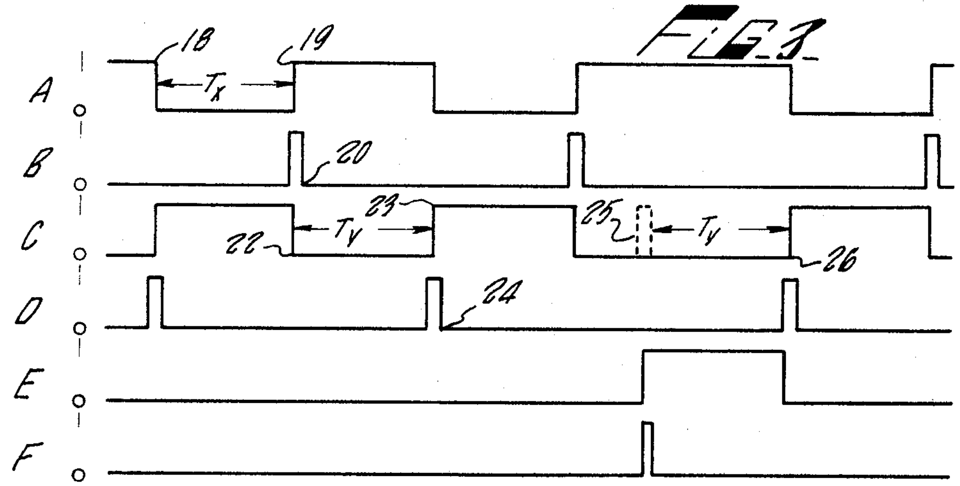
FIG. 3 is a diagram of waveforms illustrating the mode of operation of the arrangement of FIG. 1, when a synchronizing pulse appears while the bistable device is in one state.
Figure 4:
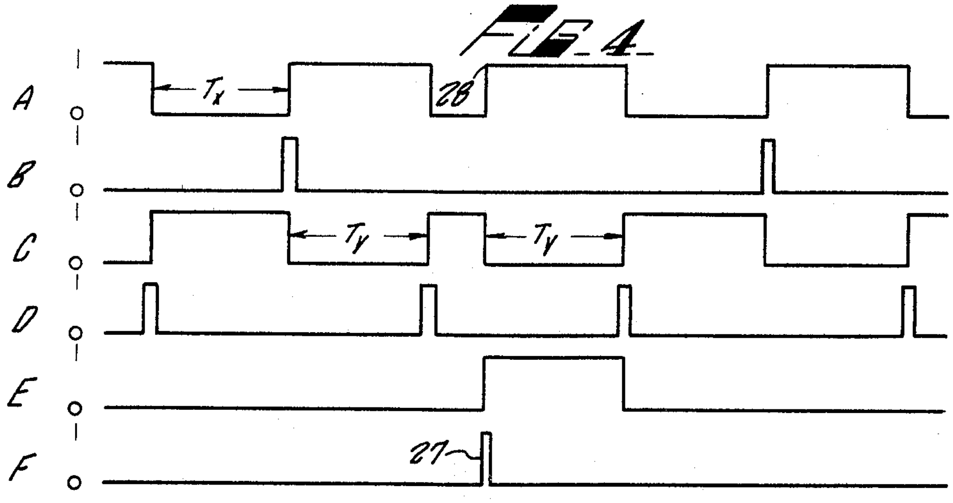
FIG. 4 is a diagram of waveforms illustrating the mode of operation of the arrangement of FIG. 1, when a synchronizing pulse appears while the bistable device is in the other state.

The letters A through F are employed in FIG. 1 to designate the points in the circuit where the corresponding waveforms in FIGS. 3 and 4 appear. After the circuit is initially energized, flip flop 2 immediately begins to operate. Thus the arrangement is self-starting without taking extra measures to insure that it starts to operate. As illustrated by waveforms A and C of FIG. 3, output terminals 3 and 4 assume complementary states throughout the operation of the circuit. During intervals of time in which no synchronizing pulses appear, the circuit operates in the following manner: When output terminal 3 of flip flop 2 changes from state "1" to state "0," occurring at point 18 on waveform A of FIG. 3, holdover circuit 7 begins to time-out its holdover delay, designated $T_x$ on waveform A of FIG. 3. At the end of the holdover delay, circuit 7 assumes state "0" and the output of inverter 8, represented by waveform B of FIG. 3, assumes state "1." The output of inverter 8 passes through OR circuit 9 and triggers a change of state of flip flop 2, as shown at point 19 in waveform A. As a result, the output of holdover circuit 7 assumes state "1" again, and the output of inverter 8 returns to state "0," as indicated at point 20 on waveform B of FIG. 3. As long as no synchronizing pulses appear, this procedure continues. Each time that the input of holdover circuit 7 changes from state "1" to state "0," holdover circuit 7 generates an indication after a predetermined time interval $T_x$ has elapsed. This indication, represented by waveform B of FIG. 3, serves as a trigger to change the state of flip flop 2.

Similarly, when output terminal 4 changes from state "1" to state "0," occurring at point 22 on waveform C of FIG. 3, holdover circuits 14 and 15 begin to time out a holdover delay $T_y$, after which the output of holdover circuit 15 changes from state "1" to state "0." The output of inverter 16, represented by waveform D of FIG. 3, then assumes state "1" and flip flop 2 is triggered into a change of state, as indicated at point 23 on waveform C of FIG. 3. As a result of the change of state of flip flop 2, the input to holdover circuit 14 assumes state "1" and the output of phase inverter 16 assumes state "0," as indicated at point 24 on waveform D of FIG. 3. As long as no synchronizing pulses appear, this procedure continues. Each time that output terminal 4 changes from state "1" to state "0" an indication is generated after a predetermined time interval elapses. This indication, represented by waveform D of FIG. 3, serves as a trigger to change the state of flip flop 2.

Flip flop 2 continues to be triggered in the described manner and to operate at a natural frequency equal to the reciprocal of the sum of the holdover delays $T_x+T_y$. Although the holdover delays $T_x$ and $T_y$ would in most applications, be equal, such a limitation is not necessary for operation of the synchronization circuit.

Upon the appearance of a synchronizing pulse while output terminal 3 of flip flop 2 is in state "1," as shown on waveform E of FIG. 3, monostable multivibrator 17 generates a pulse of predetermined width. This pulse, shown on waveform F of FIG. 3, passes through OR circuits 9 and 10. Since output terminal 3 of flip flop 2 is at this time in state "1," the synchronizing pulse is ineffective at input terminal 5. The synchronizing pulse does have effect, however, at the input of holdover circuit 14, because it resets holdover circuits 14 and 15 so that they begin to time out anew. The point in time at which the synchronizing pulse is applied to the input of holdover circuit 14 is represented on waveform C of FIG. 3 by a dashed outline at point 25. Thereafter when time duration $T_y$ has elapsed, the output of holdover circuit 15 assumes state "0" and the output of inverter 16 assumes state "1," thereby triggering a change of state of flip flop 2, as indicated at point 26 on waveform C of FIG. 3. A synchronizing pulse while output terminal 3 of flip flop 2 is in state "1" therefore prolongs the existence of this state a sufficient length of time to effect synchronization of operation of flip flop 2 with the synchronizing pulse.

The mode of operation of the circuit of FIG. 1, when a synchronizing pulse occurs while output terminal 4 of flip flop 2 is in state "1," is represented by the waveforms of FIG. 4. The pulse of predetermined width produced at the output of monostable multivibrator 17 by the synchonizing pulse is shown at point 27 on waveform F of FIG. 4. This pulse passes through OR circuit 9 and triggers flip flop 2 into a change of state, causing output terminal 3 to assume state "1" as shown at point 28. Since the input to holdover circuit 14 is already in state "1" when the synchronizing pulse appears, as shown by waveform C of FIG. 4, the synchronizing pulse has no effect on the operation of holdover circuits 14 and 15. A synchronizing pulse while output terminal 4 of flip flop 2 is in state "1" therefore shortens the existence of this state a sufficient length of time to effect synchronization of operation of flip flop 2 with the synchronizing pulse. In summary, regardless of when a synchronizing pulse appears, flip flop 2 is synchronized such that output terminal 3 changes from state "1" to state "0" a time duration $T_y$ after the synchronizing pulse appears.

Holdover circuits 14 and 15 time out from the termination of the pulse produced at the output of monostable multivibrator 17. Generally speaking, it is desirable to synchronize to the beginning of the synchronizing pulse. Therefore, to approach this condition the output pulses from monostable multivibrator 17 should be as narrow as practicable. For this reason, two holdover circuits, i.e. circuits 14 and 15, are provided in tandem. The total holdover delay $T_y$ is the sum of the individual holdover delays of circuits 14 and 15. The holdover delay of holdover circuit 14 is only large enough to insure that the timing capacitor of holdover circuit 15 completely discharges before its holdover period begins. This problem is discussed in detail in my above-mentioned patent. If the pulses produced by monostable multivibrator 17 are in a particular embodiment sufficiently wide that the timing capacitor of a single holdover circuit can completely discharge before the holdover period begins, then a second holdover circuit is not necessary.

What is claimed is:

1. A phase synchronization circuit comprising a flip flop to be synchronized, the flip flop having first and second output terminals in complementary states and having first and second input terminals each effective to introduce a different change in the state of the flip flop, a first holdover circuit connected to the first output terminal of the flip flop, the first holdover circuit generating a pulse that is held over a predetermined time after the first output terminal of the flip flop undergoes one change of state, a first OR circuit, the output of the first holdover circuit being connected to one input of the first OR circuit and the synchronizing pulses being applied to the other input of the first OR circuit, means connecting the output of the first OR circuit to the first input terminal of the flip flop, a second OR circuit, the second output terminal of the flip flop being connected to one input of the second OR circuit and the synchronizing pulses being applied to the other input of the second OR circuit, a second holdover circuit connected to the output of the second OR circuit, the second holdover circuit holding over a predetermined delay after the output of the second OR circuit undergoes the one change of state, and means connecting the second holdover circuit to the second input terminal of the flip flop.

2. The phase synchronization circuit of claim 1, in which the synchronizing pulses are applied to a monostable multivibrator, the output of which is connected to the inputs of the first and second OR circuits.

3. A phase synchronization circuit comprising:

a source of synchronizing pulses;

a bistable device to be synchronized, the bistable device having first and second output terminals in complementary states and having first and second input terminals each effective to introduce a different change in the state of the bistable device responsive to an applied pulse;

a first holdover circuit connected to the first output terminal of the bistable device, the first holdover circuit generating a pulse of predetermined time after the first output terminal of the bistable device undergoes one change of state;

means for coupling the output of the first holdover circuit and the source of synchronizing pulses to the first input terminal of the bistable device;

a second holdover circuit;

means for coupling the second output terminal of the bistable device and the source of synchronizing pulses to the input of the second holdover circuit, the second holdover circuit generating a pulse a predetermined time after the second output terminal of the bistable device undergoes the one change of state or a synchronizing pulse occurs; and means for coupling the output of the second holdover circuit to the second input terminal of the bistable device.

4. A phase synchronization circuit comprising:

a source of synchronizing pulses;

a bistable device to be synchronized, the bistable device having first and second output terminals in complementary states and having first and second input terminals each effective to introduce a different change in the state of the bistable device responsive to an applied pulse;

a first holdover circuit connected to the first output terminal of the bistable device, the first holdover circuit generating a pulse a predetermined time after the first output terminal of the bistable device undergoes one change of state;

means for coupling the output of the first holdover circuit and the source of synchronizing pulses to the first input terminal of the bistable device;

a second holdover circuit;

means for coupling the second output terminal of the bistable device and the source of synchronizing pulses to the input of the second holdover circuit, the second holdover circuit generating a pulse a predetermined time after the second output terminal of the bistable device undergoes the one change of state or a synchronizing pulse occurs;

a third holdover circuit;

means for coupling the output of the second holdover circuit to the third holdover circuit, the third holdover circuit generating a pulse a predetermined time after the pulse produced by the second holdover circuit; and means for coupling the output of the third holdover circuit to the second input terminal of the bistable device.

5. A self-starting, free-running circuit comprising:

a bistable device having first and second output terminals in complementary states and having first and second input terminals each effective to introduce a different change in the state of the bistable device responsive to the end of an applied pulse;

a first holdover circuit connected to the first output terminal of the flip-flop, the first holdover circuit generating a pulse that is held over a predetermined time after the first output terminal of the bistable device undergoes one change of state;

a second holdover circuit connected to the second output terminal of the bistable device, the second holdover circuit generating a pulse that is held over a predetermined time after the second output terminal of the bistable device undergoes the one change of state; and means for connecting the second holdover circuit to the first input terminal of the bistable device.

References Cited

UNITED STATES PATENTS

| | | | |
|---|---|---|---|
| 3,311,754 | 3/1967 | Linder et al. ---- | 307—262 XR |
| 3,327,226 | 6/1967 | Nourney ------- | 328—110 XR |

JOHN S. HEYMAN, Primary Examiner

STANLEY T. KRAWCZEWICZ, Assistant Examiner

U.S. Cl. X.R.

307—208, 262, 232, 269; 328—63